United States Patent Office 2,740,460
Patented Apr. 3, 1956

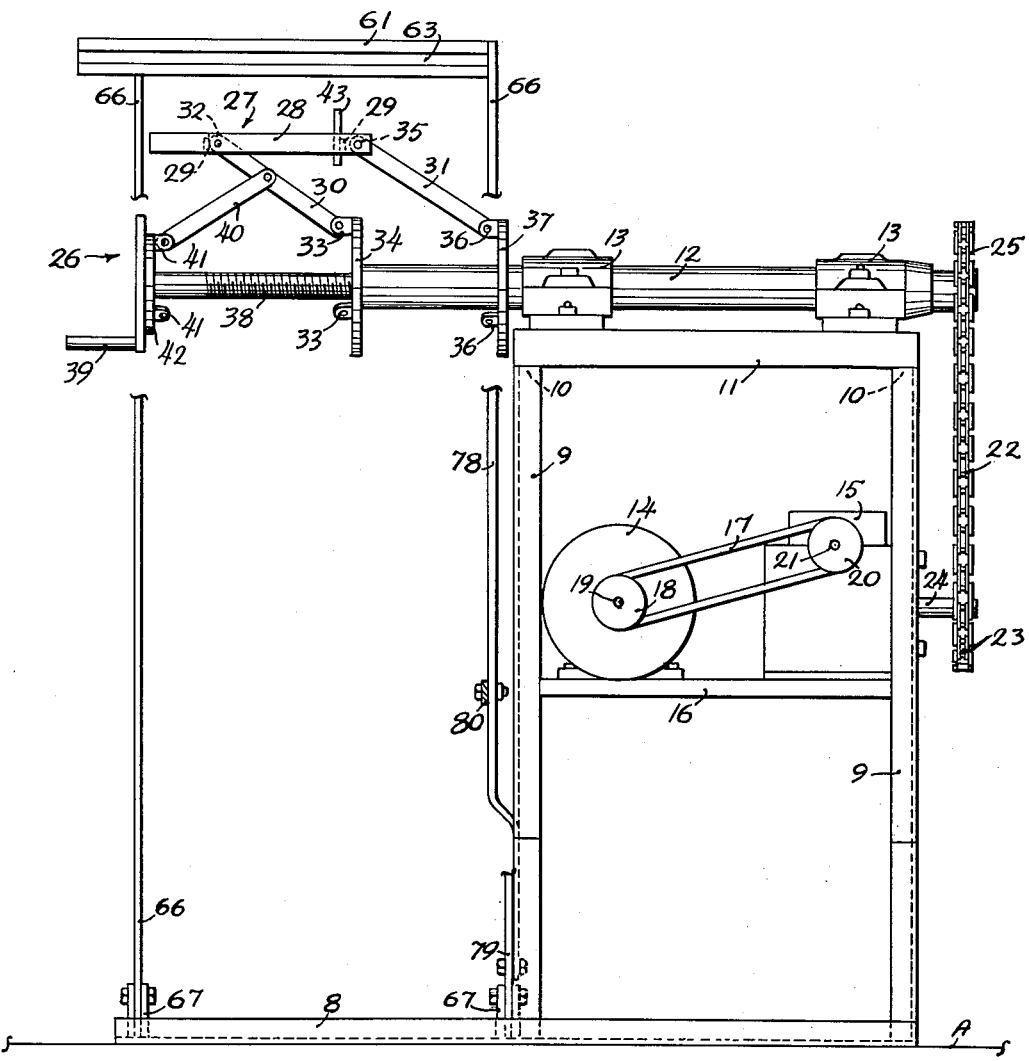

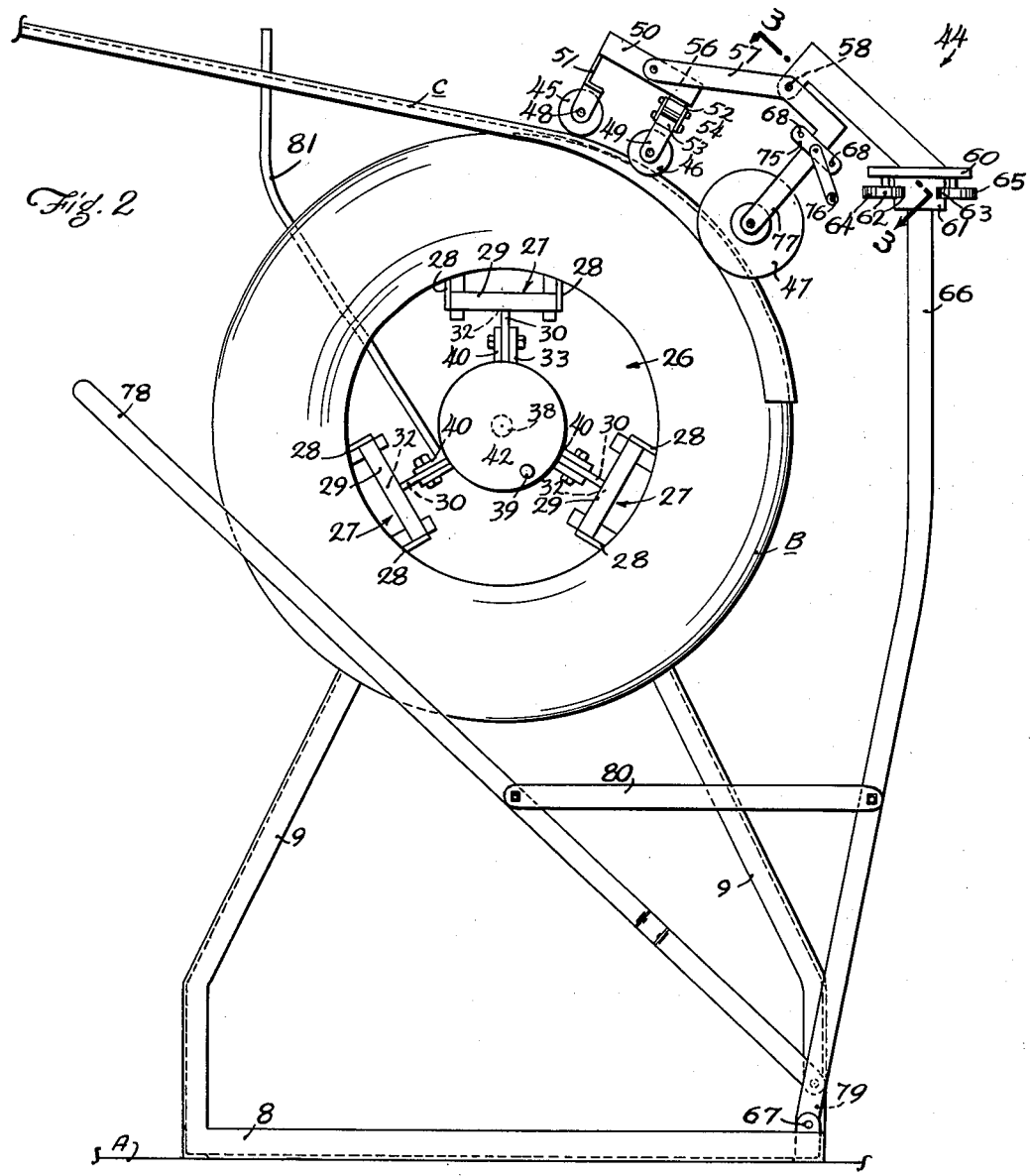

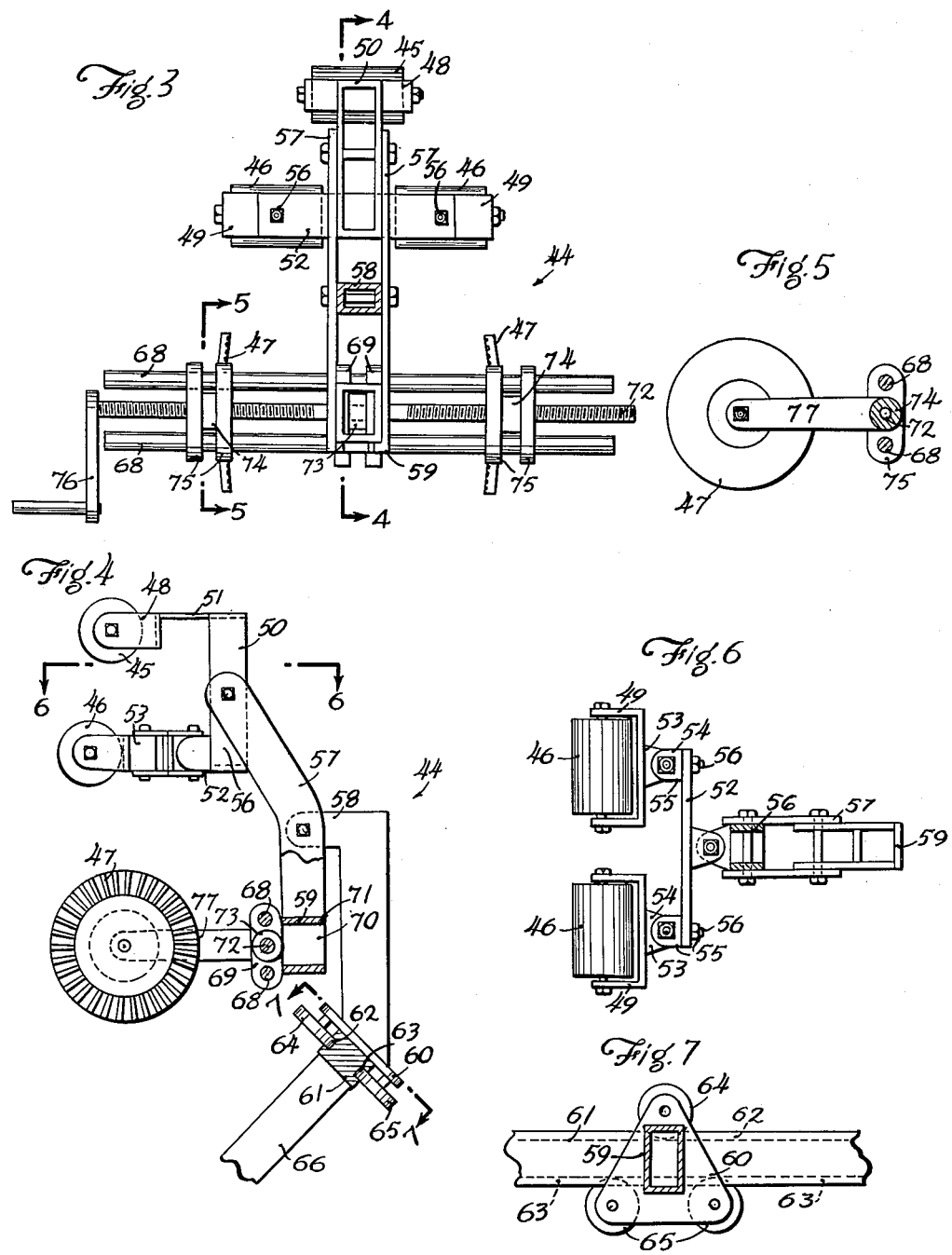

2,740,460

TIRE CAPPING MACHINE

Alf R. Miller and Leonard Frederickson,
Hutchinson, Minn.

Application January 15, 1954, Serial No. 404,253

9 Claims. (Cl. 154—9)

Our present invention relates broadly to the process of the retreading of used tires and, more particularly, to a novel machine for use in applying camel-back or tread stock to used tire casings preparatory to vulcanizing the retread to the said casing.

The principal object of this invention is to provide pressure mechanism that includes rolls that contact the crown, the sides and the longitudinal edge portions of a cap being adhesively applied to the tread of a tire casing.

A further object of this invention is the provision of a device as set forth in which the rolls for the crown, the sides and edge portions of the cap are circumferentially spaced.

A further object of the invention is the provision of a device as set forth in which the crown roll and the side rolls are journaled on a mount that is pivoted to tilt about an axis that extends transversely of the cap.

A further object of this invention is the provision of a device as set forth in which the side rolls are journaled on a mount to turn about axes in a plane that extends transversely of the cap and to independently tilt in said plane.

A further object of this invention is the provision of a device as set forth in which the rolls for the longitudinal edge portions of the cap are simultaneously adjustable axially toward and from each other.

A further object of this invention is the provision of a device as set forth in which the rolls for the edge portions of the cap are journaled on one end portion of a mount intermediately pivoted to oscillate in the plane of the cap and in which the roll for the crown and the rolls for the sides of the cap are journaled to opposite end portions of a frame intermediately pivoted to the opposite end of the mount from the first noted rolls.

A further object of this invention is the provision of a device as set forth in which the pressure mechanism normally rests on the cap by the action of gravity and in which the pressure mechanism is mounted for movement to and from an operative position in the plane of the cap.

A further object of the invention is to provide a device as set forth in which the pressure mechanism is bodily adjustable transversely of the plane of the tire mount.

These and other objects of the invention will be apparent from the following description, reference being had to the drawings.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 1 is a rear elevational view of my invention with some parts removed and other parts broken away;

Fig. 2 is a left-hand end elevational view of the machine as shown in Fig. 1;

Fig. 3 is a top view of the tire cap pressure mechanism with the parts thereof moved into a substantially straight line and with some parts sectioned on the line 3—3 of Fig. 2, on an enlarged scale;

Fig. 4 is a side elevational view of the cap pressure mechanism and mount therefor, on the same scale as Fig. 3;

Fig. 5 is a detail view partly in side elevation and partly in section taken on the line 5—5 of Fig. 3;

Fig. 6 is a detail view partly in side elevation and partly in section taken on the line 6—6 of Fig. 4; and Fig. 7 is a detail view partly in plan and partly in section taken on the line 7—7 of Fig. 4.

The numeral 8 indicates a horizontally disposed rectangular base formed of an angle bar that rests on a floor A. Two pairs of legs 9 are fixed at their lower ends to the side members of the base 8. Short lower end portions of the legs 9 are vertical and the long upper portions of each pair of said legs are in upwardly converging relation. The legs 9 of each pair, at their upper ends, are connected by a horizontal cross-tie member 10. Each pair of legs 9 and their cross-tie members 10 are formed of a single angle bar.

A bed 11 rests on the cross-tie members 10 and is fixed thereto, and a horizontal shaft 12 extends longitudinally over the bed 11 at its transverse center and is journaled in a pair of axially spaced bearings 13 fixed to said bed, as shown in Fig. 1. This shaft 12 is driven, at a very slow speed, by an electric motor 14 and a gear reduction unit 15. The motor 14 and the unit 15 are fixed on a shelf 16 secured to the legs 9 below the bed 11. A belt 17 runs over a pulley 18 on the armature shaft 19 of the motor 14 and a pulley 20 on a shaft 21 projecting outwardly of the unit 15. A sprocket chain 22 runs over a sprocket wheel 23 on a shaft 24 that projects outwardly of the unit 15 and a sprocket wheel 25 on the right-hand end of the shaft 12 in respect to Fig. 1.

A tire casing mount 26, at the opposite end of the shaft 12 from the sprocket wheel 25, includes three horizontally disposed rectangular clamps 27 circumferentially spaced equi-distantly apart about the projected axis of the shaft 12, and are parallel thereto. Each clamp 27 is transversely perpendicular to a radial line extending from the projected axis of the shaft 12 to the transverse center of said clamp. The clamps 27 each includes a pair of side bars 28 that extend parallel to the projected axis of the shaft 12 and a pair of end bars 29 fixed to the side bars 28 inwardly of their ends. The bars 28—29 are flat and edgewise to the planes of the clamps 27 and the side bars 28 project outwardly of the end bars 29.

Each clamp 27 is attached to the shaft 12 by an outer link 30 and an inner link 31 in the same plane parallel to the side bars 28. These links 30—31 are outwardly oblique to the projected axis of the shaft 12. The link 30 is pivoted at one of its ends to ears 32 fixed to the outer end bar 29 at its transverse center and pivoted at its other end to ears 33 fixed to a disk 34 at its perimeter. This disk 34 is fixed to the shaft 12 at its outer end in axial alignment therewith. The link 31 at one of its ends is pivoted to ears 35 fixed to the inner end bar 29 at its transverse center. The link 31 at its other end is pivoted to ears 36 fixed to a disk 37 at its perimeter. This disk 37 is fixed to the shaft 12 inwardly of the disk 34 in axial alignment therewith.

The clamps 27 are simultaneously moved outwardly or inwardly by a long feed screw 38 that projects endwise into the left-hand end portion of the shaft 12, in respect to Fig. 1, and has screw-threaded engagement therewith. A hand crank 39 is fixed to the outer end of the feed screw 38 by which it may be turned. Each clamp 27 is connected to the feed screw 38 by pairs of parallel links 40 pivoted at one of their ends to the respective link 30, at its intermediate portion and pivoted at their other ends to ears 41 fixed to a disk 42. The disk 42 is loose at its axis on the feed screw 38 and impinges the hand crank at its inner side as a base of resistance. Obviously, the shaft 12, when rotated, turns the mount 26 which is connected thereto by the links 30—31 and the disks 34—37 which are fixed to said shaft.

A tire casing B is mounted on the clamps 27 and held for rotation therewith. To apply the tire casing B to the mount 26, the feed screw 38 is operated by the hand crank 39 to bring the clamps 27 into a position in which the tire casing B may be moved axially toward the mount 26 to project the clamps 27 through said casing. A pair of outwardly projecting stop fingers 43 is fixed to the inner end portions of the bars 29 of each clamp 27 to be engaged by the bead on the inner side of the casing B to limit the movement of said casing on the respective clamp 27. These stop fingers 43 position that tire casing B on the frames so that it is in a true perpendicular position to the projected axis of the shaft 12.

After a tire casing is positioned on the clamps 27, the feed screw 38 is again operated to move said clamps outwardly into tight engagement with the beads of said tire casing and thereby secure the same to the tire mount 26 for rotation therewith.

Pressure mechanism 44 is provided for pressing a cap C onto the tread of the tire casing B slightly rearwardly of the uppermost portion thereof, as shown in Fig. 2. This mechanism 44 includes a front roll 45 that rests on the crown of the cap C, a pair of intermediate rolls 46 that rest on the cap C, one on each side of its crown, a pair of rear rolls 47 in the form of toothed wheels similar to bevel gears. These rolls 47 press the extreme outer edge portions of the cap C onto the tire casing B. All of the rolls turn about axes that extend transversely of said casing. The axes of the intermediate rolls 46 and also the axes of the rear rolls 47 are downwardly tilted in the same planes.

The roll 45 is journaled to the side members of a yoke-like bearing 48 that straddles said roll and each roll 46 is journaled in a similar bearing 49. The bearings 48 and 49 are attached to an elongated frame 50 that overlies said bearings. Integral with the front end of the frame 50 is a depending L-shaped member 51 fixed at its lower end portion to the bearing 48 at its longitudinal center. A flat horizontal bar 52 extends transversely under the rear end portion of the frame 50 and is fixed thereto at its longitudinal center. Each bearing 49 has at its longitudinal center an upstanding lug 53 that extends between the ears 54 of a yoke-like member 55 and is pivoted thereto to turn about an axis that extends transversely over the respective roll 46. The lugs 53 are attached one to each end portion of the bar 52 by a nut-equipped stud 56.

The frame 50 is intermediately pivoted to the front end portions of a pair of laterally spaced bars 57 to turn about a horizontal axis. The bars 57 extend between the side members of the frame 50 and are intermediately pivoted to a depending lug 58 integral with the outer end portion of a rectangular tubular arm 59.

A horizontal bearing plate 60 fixed to the lower or rear end of the arm 59 in an oblique position thereto slidably rests on a horizontal rail 61 that extends parallel to the shaft 12. The rail 61 is rectangular in cross-section and has in its front and back substantially square runways 62 and 63, respectively. A roller 64 journaled in the plate 60 on its under side runs in the runway 62 and a pair of rollers 65 are similarly journaled in the plate 60 and run in the runway 63. The rail 61 is fixed to the free ends 47 of a pair of long upstanding arms 66 pivoted at their lower ends to pairs of ears 67 fixed to the rear member of the base 8 for swinging movement transversely of the shaft 12 and its projected axis. The left-hand ends of the runways 62 and 63, in respect to Fig. 1, are open to permit the insertion of the rollers 64 and 65 into or out of said runways.

Referring again to the rolls 47, the following described mount is provided therefor together with means for axially adjusting the same toward and from each other: A pair of long horizontal round rods 68, spaced the one above the other parallel to the shaft 12, extend endwise through holes in a pair of laterally spaced plates 69 that afford a slide. These plates 69 have integral rearwardly projecting ears 70 that extend into a pocket 71 in the rear end portion of the bars 57 and fixed thereto. The rods 68, at their longitudinal center, are rigidly secured to the plates 69. A long feed screw 72, parallel to the rods 68, extends loosely through aligned holes in the plates 69 midway between the rods 68. A collar 73 on the screw 72 between the plates 69 is fixed thereto at its longitudinal center and holds said screw from endwise movement. The threads on one end portion of the screw 72 are right-hand and the threads on the other end portion of the screw 72 are left-hand.

A nut 74 is fixed to and between a pair of laterally spaced plates 75 having aligned holes through which the rods 68 extend. The screw 72 also loosely extends through aligned holes in the plates 75. Fixed on the outer left-hand of the screw 72 (Fig. 3) is a hand crank 76, by which the screw may be turned. Each roll 47 is journaled on the outer end portion of an arm 77 fixed to one of the nuts 74 perpendicular to the plane of the rods 68.

The arms 66 are moved pivotally to place the rolls 45, 46, and 47 on the cap C or remove the same therefrom by a hand lever 78 pivoted to and between a pair of upstanding ears 79 fixed to the base 8. The hand lever 78 is intermediately connected to the right-hand arm 66 by a link 80 pivoted at one end to the lever 78 and pivoted at its other end to the respective arm 66. A stop rod 81 fixed to the left-hand front leg 9 is provided for guiding the cap endwise in the plane of the tire A onto the tread of the tire casing B by holding its adjacent longitudinal edge in contact therewith.

From the above description, it is evident that the bars 28 are free to move pivotally so that rolls 47 are always pressed onto the longitudinal edge portions of the cap C with a constant and even pressure. Said bars 57 in turn hold the frame 50 with the rolls 45 and 46 pressed onto the cap C. The frame 50 is also free to move pivotally so that the rolls 45 and 46 engage the cap C with a constant and equal pressure. By operating the feed screw 72, the rolls 47 may be adjusted toward or from each other to position their teeth for contact with cap C at their longitudinal edge portions. The rolls 45, 46 and 47 rest on the cap C by the force of gravity and by means of the lever 78, the arms 66 may be operated to move the rolls 45, 46 and 47 and all other parts carried thereby to and from operative positions. It is also evident that the rolls 46 are free to move independently transversely of the cap C so that they are self-adjusting to the sides of said cap.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein, or required by the prior art.

What we claim is:

1. In a tire capping machine, a rotatable tire casing mount, means for rotating the mount, and pressure mechanism including a front roll, two axially spaced intermediate rolls, and two axially spaced rear rolls, said rolls being circumferentially spaced about the tire, the axes of the rolls being horizontally disposed substantially parallel to the axis of the tire, said front roll being arranged to run on the crown of the cap and press the same onto the tire, the intermediate rolls being arranged to follow the front roll and run on the cap, one on each side of the crown and press the cap onto the tire, the rear rolls being arranged to follow the intermediate rolls and run on the cap, one on the extreme outer edge portion of the cap and press the same onto the tire.

2. The structure defined in claim 1, further including a frame intermediately pivoted to turn about a horizontal axis substantially parallel to the axes of the front and intermediate rolls, said frame having a bearing fixed to its front end portion in which the front roll is journaled, said frame having at its rear end portion a pair of bearings in which the intermediate rolls are journaled, said pair of bearings each being pivoted to turn about an axis transversely of the axis of the respective intermediate roll, whereby said roll is free to tilt transversely of the tire.

3. The structure defined in claim 1, further including a frame intermediately pivoted to turn about a horizontal axis substantially parallel to the axes of the front and intermediate rolls, said frame having a bearing fixed to its front end portions in which the front roll is journaled, a bar substantially parallel to the axis of the intermediate rolls, and intermediately pivoted to the rear end portion of the frame to swing about an axis that extends transversely of the bar, a pair of bearings in which the intermediate rolls are journaled, said pair of bearings each being pivoted to turn about an axis transversely of the axis of the respective intermediate roll whereby said roll is free to tilt transversely of the tire.

4. The structure defined in claim 1, further including means for imparting reverse axial movements to the rear rolls.

5. The structure defined in claim 1, further including a held arm, a pair of parallel bars intermediately pivoted to the arm to move in the plane of the tire, a frame intermediately pivoted to the outer end portions of the bars to turn about a horizontal axis substantially parallel to the axes of the front and intermediate rolls, said frame having a bearing fixed to its front end portion in which the front roll is journaled, said frame having at its rear end portion a pair of bearings in which the intermediate rolls are journaled, said pair of bearings each being pivoted to turn about an axis transversely of the axis of the respective intermediate roll, whereby said roll is free to tilt transversely of the tire, and a pair of bearings attached to the rear end portion of the bars in which the rear rolls are journaled.

6. The structure defined in claim 1, further including a held arm, a pair of parallel bars intermediately pivoted to the arm to move in the plane of the tire, a frame intermediately pivoted to the outer end portions of the bars to turn about a horizontal axis substantially parallel to the axes of the front and intermediate rolls, said frame having a bearing fixed to its front end portion in which the front roll is journaled, said frame having at its rear end portion a pair of bearings in which the intermediate rolls are journaled, said pair of bearings each being pivoted to turn about an axis transversely of the axis of the respective intermediate roll, whereby said roll is free to tilt transversely of the tire, a pair of parallel rods fixed at their longitudinal centers to the rear end portions of the bars, a screw rod turnably mounted at its longitudinal center in the rear end portions of the bars and held from axial movement, the rear rolls being slidably mounted one on each of the end portions of the rods, a nut on each end portion of the screw rod and fixed to the respective rear roll, and means for turning the screw rod.

7. The structure defined in claim 1, further including an arm mounted for horizontal adjustment transversely of the plane of the tire, a pair of parallel bars intermediately pivoted to the arm to move in the plane of the tire, a frame intermediately pivoted to the outer end portions of the bars to turn about a horizontal axis substantially parallel to the axes of the front and intermediate rolls, said frame having a bearing fixed to its front end portion in which the front roll is journaled, said frame having at its rear end portion a pair of bearings in which the intermediate rolls are journaled, said pair of bearings each being pivoted to turn about an axis transversely of the axis of the respective intermediate roll, whereby said roll is free to tilt transversely of the tire, and a pair of bearings attached to the rear end portion of the bars in which the rear rolls are journaled.

8. The structure defined in claim 1, further including a horizontal rail extending transversely of the plane of the tire, a roller-equipped member mounted to travel longitudinally on the rail, an arm fixed to said member, a pair of parallel bars intermediately pivoted to the arm to move in the plane of the tire, a frame intermediately pivoted to the outer end portions of the bars to turn about a horizontal axis substantially parallel to the axes of the front and intermediate rolls, said frame having a bearing fixed to its front end portion in which the front roll is journaled, said frame having at its rear end portion a pair of bearings in which the intermediate rolls are journaled, said pair of bearings each being pivoted to turn about an axis transversely of the axis of the respective intermediate roll, whereby said roll is free to tilt transversely of the tire, and a pair of bearings attached to the rear end portion of the bars in which the rear rolls are journaled.

9. The structure defined in claim 1, further including a pair of long upright arms pivoted at their lower end portions to move parallel to the plane of the tire, means for operating the arms, a horizontal rail fixed to the upper ends of the arms transversely of the plane of the tire, a roller-equipped member mounted to travel longitudinally on the rail, an arm fixed to said member, a pair of parallel bars intermediately pivoted to the arm to move in the plane of the tire, a frame intermediately pivoted to the outer end portions of the bars to turn about a horizontal axis substantially parallel to the axes of the front and intermediate rolls, said frame having a bearing fixed to its front end portion in which the front roll is journaled, said frame having at its rear end portion a pair of bearings in which the intermediate rolls are journaled, said pair of bearings each being pivoted to turn about an axis transversely of the axis of the respective intermediate roll, whereby said roll is free to tilt transversely of the tire, and a pair of bearings attached to the rear end portion of the bars in which the rear rolls are journaled.

References Cited in the file of this patent

UNITED STATES PATENTS

| | | |
|---|---|---|
| 2,474,511 | Bacon | June 28, 1949 |
| 2,498,953 | Glynn | Feb. 28, 1950 |
| 2,521,143 | Benson | Sept. 5, 1950 |
| 2,556,264 | Flynn | June 12, 1951 |
| 2,600,291 | Engler | June 10, 1952 |